United States Patent
Jarvis et al.

(10) Patent No.: US 10,782,947 B2
(45) Date of Patent: *Sep. 22, 2020

(54) SYSTEMS AND METHODS OF DIAGRAM TRANSFORMATION

(71) Applicant: Capital One Services, LLC, McLean, VA (US)

(72) Inventors: Daniel Alan Jarvis, Vienna, VA (US); Swaraj Satyajeet Dhumne, Centreville, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,433

(22) Filed: May 9, 2019

(65) Prior Publication Data

US 2020/0026503 A1     Jan. 23, 2020

Related U.S. Application Data

(63) Continuation of application No. 16/039,748, filed on Jul. 19, 2018, now Pat. No. 10,331,426.

(51) Int. Cl.
*G06F 9/44* (2018.01)
*G06F 8/51* (2018.01)
(Continued)

(52) U.S. Cl.
CPC ............. *G06F 8/51* (2013.01); *G06F 40/14* (2020.01); *G06F 40/151* (2020.01); *G06K 9/00456* (2013.01)

(58) Field of Classification Search
CPC ........................................... G06F 8/51
See application file for complete search history.

(56) References Cited

U.S. PATENT DOCUMENTS

| 7,730,043 B1 * | 6/2010 | Bourdev | ................. G06T 11/60 |
| | | | 707/695 |
| 9,361,094 B1 * | 6/2016 | Xie | .......................... G06F 8/74 |
| (Continued) | | | |

OTHER PUBLICATIONS http://plantuml.com/component-diagram; Sep. 22, 2016.
http://www.w3computing.com/systemsanalysis/sequence-communication-diagrams/; Sep. 23, 2014.

*Primary Examiner* — Hang Pan
(74) *Attorney, Agent, or Firm* — Troutman Pepper Hamilton Sanders LLP; Christopher J. Forstner; Brennan M. Carmody

(57) ABSTRACT

A system including a processor; and a memory having stored thereon computer program code that, when executed by the processor, controls the processor to: receive data indicative of a plurality of sequence diagrams; for each of the plurality of sequence diagrams, generate a corresponding architecture diagram by: identifying a plurality of participants within the sequence diagram, transforming each of the plurality of participants into a plurality of nodes, identifying a plurality of messages identifying at least one message participant, and transforming the identified plurality of messages by establishing a single edge between respective nodes of the plurality of nodes corresponding to message participants identified by one or more messages of the plurality of messages; and merge the corresponding architecture diagrams of each of the plurality of sequence diagrams to generate a master architecture diagram.

19 Claims, 16 Drawing Sheets

(51) Int. Cl.
    *G06K 9/00*         (2006.01)
    *G06F 40/14*       (2020.01)
    *G06F 40/151*     (2020.01)

(56) References Cited

U.S. PATENT DOCUMENTS

| | | | |
|---|---|---|---|
| 9,369,338 B1* | 6/2016 | Krishnaswamy | H04L 41/0668 |
| 2003/0001873 A1* | 1/2003 | Garfield | G06F 16/94 |
| | | | 715/700 |
| 2005/0267921 A1* | 12/2005 | Bali | G06F 16/27 |
| 2005/0289526 A1* | 12/2005 | Wang | G06F 8/10 |
| | | | 717/144 |
| 2006/0161890 A1 | 7/2006 | Green | |
| 2010/0037203 A1* | 2/2010 | Limburn | G06F 8/33 |
| | | | 717/105 |
| 2011/0107303 A1* | 5/2011 | Huang | G06F 8/71 |
| | | | 717/123 |

* cited by examiner

SYSTEMS AND METHODS OF DIAGRAM TRANSFORMATION

CROSS REFERENCE TO RELATED APPLICATIONS

This application is a continuation of, and claims priority under 35 U.S.C. § 120 to, U.S. patent application Ser. No. 16/039,748, filed Jul. 19, 2018, the entire contents of which is incorporated herein by reference in its entirety.

FIELD

The present disclosure relates to systems and methods of diagram transformation, and, more particularly, to systems and method of transforming one or more sequence diagrams into architecture diagrams and linked message lists.

BACKGROUND

Sequence diagrams show the interaction logic between the objects in a system in the time order that the interactions take place. Sequence diagrams may be useful for documenting the system's requirements and to flush out the system's design. However, because of the high level of detail, it is difficult to maintain an overall picture of logic interactions for more complicated systems. That is, the overall view of a high-level architecture (such as which components are grouped together, and which belong to different/external systems, teams, organizations/infrastructures) may be lost. Moreover, it is difficult to combine different sequence diagrams as message order logic does not readily translate between logic flows.

Accordingly, there is a need for systems and methods for providing transformation of sequence diagrams into architectural diagrams. Moreover, there is a need to readily combine sequence diagrams to view an overall system structure, as well as to provide navigable architecture diagrams. Certain embodiments of the present disclosure address these and other issues.

SUMMARY

Disclosed embodiments provide systems and methods transform sequence diagram(s) into architectural diagram(s).

According to some embodiments, there is provided a system including: at least one processor; and at least one memory having stored thereon computer program code that, when executed by the at least one processor, controls the processor to: receive data indicative of a plurality of sequence diagrams; for each of the plurality of sequence diagrams, generate a corresponding architecture diagram by: identifying, within the data indicative of the sequence diagram, a plurality of participants within the sequence diagram; transforming each of the plurality of participants into a respective node, creating a plurality of nodes; identifying, within the data indicative of the sequence diagram, a plurality of messages, each message of the plurality of messages identifying at least one message participant of the plurality of participants; and transforming the identified plurality of messages by: storing, for each message of the plurality of messages, data indicative of the message in association with at least one respective nodes of the plurality of nodes corresponding to the at least one message participant identified by the message; establishing a single edge between respective nodes of the plurality of nodes corresponding to message participants identified by one or more messages of the plurality of messages; and for each message of the plurality of messages identifying two message participants, further storing message data corresponding to the message in association with the single edge between respective nodes corresponding to the identified two message participants; and merge the corresponding architecture diagrams of each of the plurality of sequence diagrams to generate a master architecture diagram.

The computer program code may control the processor to merge the corresponding architecture diagrams by: identifying one or more co-present nodes within respective architecture diagrams of the of corresponding architecture diagrams; overlaying the respective architecture diagrams; and removing redundant nodes and edges from the overlaid diagrams.

The computer program code may control the processor to: receive an indication of a selection of a first sequence diagram of the plurality of sequence diagrams; and emphasize, within the master architecture diagram and in response to receiving the indication of the selection, a plurality of nodes and edges of the master architecture diagram corresponding to the selected first sequence diagram.

The computer program code may further control the processor to, for each of the plurality of sequence diagrams, generate a message listing from the identified plurality of messages, the message listing comprising a plurality of selectable message items corresponding to respective messages of the plurality of messages.

The computer program code may control the processor to merge the corresponding architecture diagrams by: identifying one or more shared nodes between respective architecture diagrams of the of corresponding architecture diagrams; overlaying the respective architecture diagrams; combining the message listings of the respective architecture diagrams; and removing redundant nodes and edges from the overlaid diagrams.

The computer program code may further control the processor to: receive an indication of a selection of a first sequence diagram of the plurality of sequence diagrams; emphasize, within the master architecture diagram and in response to receiving the indication of the selection, a plurality of nodes and edges of the master architecture diagram corresponding to the selected first sequence diagram; and emphasize, in response to receiving the indication of the selection, message items within the combined message listing corresponding to the selected first sequence diagram.

The computer program code may control the processor to receive the data indicative of the plurality of sequence diagrams by crawling a repository storing the plurality of sequence diagrams.

The computer program code may further control the processor to update the master architecture diagram by: identifying, within the repository, alterations to a first sequence diagram of the plurality of sequence diagrams, the first sequence diagram corresponding to a first architecture diagram of the corresponding architecture diagrams; modifying at least one of nodes and edges of the first architecture diagram based on the identified alterations; and merging the modified first architecture diagram with the master architecture diagram.

The computer program code may further control the processor to present, within the master architecture diagram, a selectable indicator to display either the un-updated master architecture diagram including the unmodified first architecture diagram or the updated master architecture diagram including the modified first architecture diagram.

The computer program code may further control the processor to update the master architecture diagram by: identifying, from within the repository, a removal of a first sequence diagram of the plurality of sequence diagrams, the first sequence diagram corresponding to a first architecture diagram of the corresponding architecture diagrams; and extracting, from the master architecture diagram, the first architecture diagram.

According to some embodiments, there is provided a system comprising: at least one processor; and at least one memory having stored thereon computer program code that, when executed by the at least one processor, controls the processor to: receive data indicative of a plurality of sequence diagrams; for each of the plurality of sequence diagrams, generate a corresponding architecture diagram by: identifying, within the data indicative of the sequence diagram, a plurality of participants within the sequence diagram; transforming each of the plurality of participants into a respective node, creating a plurality of nodes; identifying, within the data indicative of the sequence diagram, a plurality of messages, each message of the plurality of messages identifying at least one message participant, each message participant being a participant of the plurality of participants; and transforming the identified plurality of messages by establishing a single edge between respective nodes of the plurality of nodes corresponding to message participants identified by one or more messages of the plurality of messages; and merge the corresponding architecture diagrams of each of the plurality of sequence diagrams to generate a master architecture diagram.

The computer program code may control the processor to merge the corresponding architecture diagrams by: identifying one or more shared nodes between respective architecture diagrams of the of corresponding architecture diagrams; overlaying the respective architecture diagrams; and removing redundant nodes and edges from the master architecture diagram.

According to some embodiments, there is provided a system comprising: at least one processor; and at least one memory having stored thereon computer program code that, when executed by the at least one processor, controls the processor to: receive data indicative of a sequence diagram; identify, within the data indicative of the sequence diagram, a plurality of participants in the sequence diagram; transform each of the plurality of participants into a respective node, creating a plurality of nodes; identify, within the data indicative of the sequence diagram, a plurality of messages, each message of the plurality of messages identifying at least one message participant, each message participant being a participant of the plurality of participants; and transform the identified plurality of messages by: storing, for each message of the plurality of messages, data indicative of the message in association with at least one respective nodes of the plurality of nodes corresponding to the at least one message participant identified by the message; establishing a single edge between respective nodes of the plurality of nodes corresponding to message participants identified by one or more messages of the plurality of messages; and for each message of the plurality of messages identifying two message participants, further storing message data corresponding to the message in association with the single edge between respective nodes corresponding to the identified two message participants.

The computer program code may further control the processor to: generate a message listing from the identified plurality of messages, the message listing comprising a plurality of selectable message items corresponding to respective messages of the plurality of messages; receive an indication of a selection of a first message item of the plurality of message items, the first message item corresponding to a first message of the plurality of messages; and emphasize, in response to receiving the indication of the selection, at least one node of the plurality of nodes corresponding to the at least one message participant identified by the first message.

The computer program code may further control the processor to: generate a message listing from the identified plurality of messages, the message listing comprising a plurality of selectable message items corresponding to respective messages of the plurality of messages; receive an indication of a selection of a first message item of the plurality of message items, the first message item corresponding to a first message of the plurality of messages, the first message identifying two message participants; and emphasize, in response to receiving the indication of the selection, the single edge between two nodes of the plurality of nodes corresponding to the two message participants identified by the first message.

The computer program code may further control the processor to: generate a message listing from the identified plurality of messages, the message listing comprising a plurality of selectable message items corresponding to respective messages of the plurality of messages; receive an indication of a selection of a first message item of the plurality of message items, the first message item corresponding to a first message of the plurality of messages, the first message identifying two message participants and a message direction; and emphasize, in response to receiving the indication of the selection, the single edge between two nodes of the plurality of nodes corresponding to the two message participants identified by the first message and outputting for display a directional indicator on the edge corresponding to the message direction identified by the first message.

The computer program code may further control the processor to: identify, within the data indicative of the sequence diagram, a stereotype associated with each of the plurality of participants; and output for display a visual grouping of nodes of the plurality of nodes based on the stereotype associated with the respective participants.

The computer program code may further control the processor to: identify, within the data indicative of the sequence diagram, a plurality of dividers separating messages from among the plurality of messages; and generate a message listing from the identified plurality of messages, the message listing comprising a plurality of message groups corresponding to respective one or more messages of the plurality of messages, the message groups being arranged based on the dividers.

The computer program code may further control the processor to: receive an indication of a selection of a first message group from among the plurality of message groups; and emphasize, in response to receiving the indication of the selection, a plurality of nodes and edges identified by the one or more messages of the first message group.

The computer program code may further control the processor to: receive the data indicative of the sequence diagram by crawling a repository including the sequence diagram; identify one or more documents corresponding to a first participant of the plurality of participants, the first participant corresponding to a first node of the plurality of nodes; and link the one or more documents to the first node.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The present disclosure is directed to methods and systems for transforming sequence diagrams into architectural diagrams. The present disclosure also relates to generating master architecture diagrams from a plurality of sequence diagrams. Moreover, the present disclosure all relates to providing enhanced functionality to the architecture diagrams by transforming the sequence diagram elements and linking transformed elements within the architectural diagram.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1:
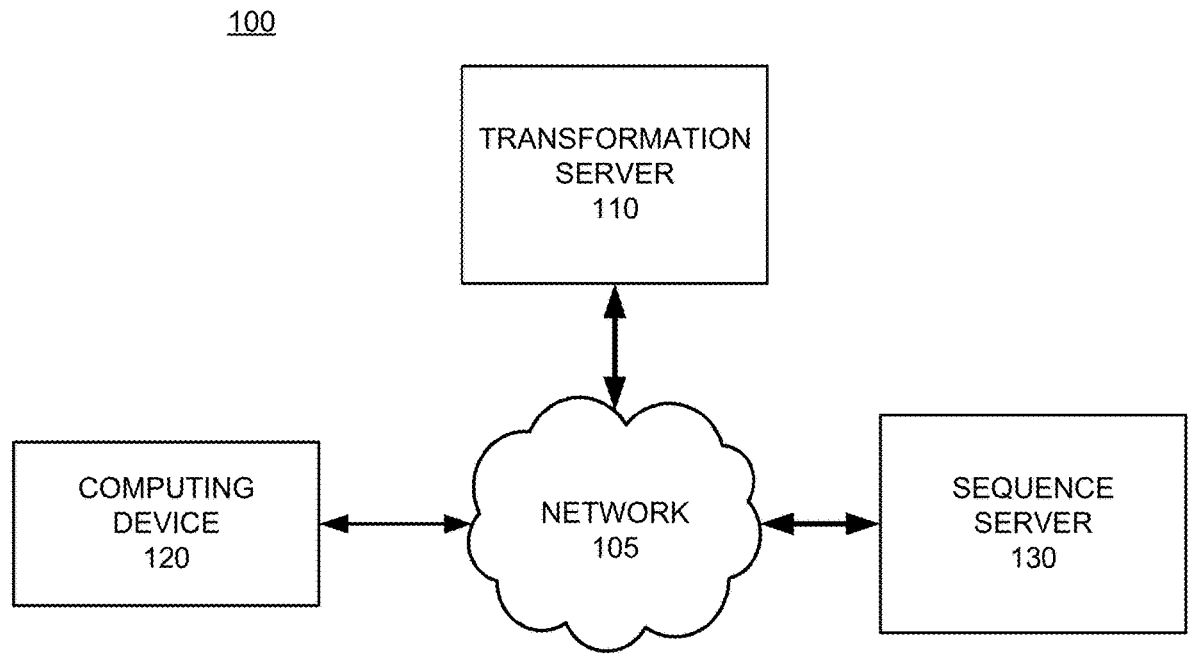
FIG. 1 is a diagram of an example system environment that may be used to implement one or more embodiments of the present disclosure.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system environment 100 may include a transformation server 110 in communication with a computing device 120 and sequence server 130 via network 105. In some embodiments, transformation server 110 may also be in communication with various databases (e.g., sequence repository or code database). Computing device 120 may be a mobile computing device (e.g., a smart phone, tablet computer, smart wearable device, portable laptop computer, voice command device, wearable augmented reality device, or other mobile computing device) or a stationary device (e.g., desktop computer or automatic teller machine (ATM)).

In some embodiments, transformation server 110 may access sequence server 130 and receive data indicative of a plurality of sequence diagrams. Transformation server 110 may transform one or more sequence diagrams into one or more architecture diagrams, for example, as described in more detail below. Transformation server 110 may, for each sequence diagram, identify a plurality of participants, transform the participants into a plurality of nodes, identify a plurality of messages, and transform the messages into a plurality of edges between nodes. If multiple sequence diagrams are transformed, a plurality of architecture diagrams may be created, and transformation server 110 may merge the plurality of architecture diagrams to form a master architecture diagram. Transformation server 110 may transform the plurality of messages by determining nodes corresponding to participants of the message, establishing a single link between nodes sharing at least one message. Transformation server 110 may store message data for messages with a single participant corresponding to the single node. Transformation server 110 may store message data for messages with two participants corresponding to the single edge between the corresponding nodes.

User device 130 may access and navigate the architecture diagrams created by transformation server 110. In some cases, transformation server 110 may host the architecture diagrams, and user device 130 may communicate with transformation server 110. In some cases, transformation server 110 may store the architecture diagrams on a separate database, and user device 130 may communicate with database.

Sequence server 130 may store one or more sequence diagrams. In some cases, sequence server 130 may store sequence diagrams in association with each other (e.g., belonging to a same overall system). Sequence server may log changes to the one or more sequence diagrams, and/or the addition or removal of sequence diagrams from the sequence server 130 or additions or removal to an overall system. Sequence server 130 may notify transformation server 110 of any changes, and transformation server 110 may update the architecture diagrams based on the changes.

Network 105 may be of any suitable type, including individual connections via the internet such as cellular or Wi-Fi networks. In some embodiments, network 105 may connect terminals using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
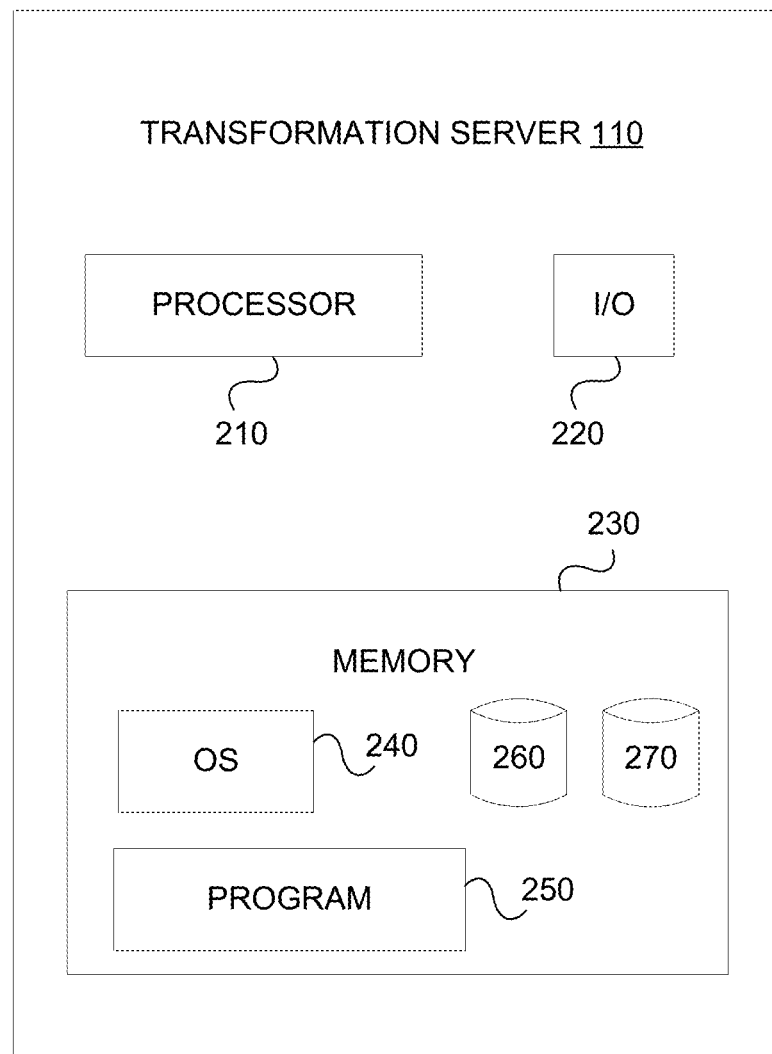
FIG. 2 is a component diagram of a service provider terminal according to an example embodiment.

An example embodiment of transformation server 110 is shown in more detail in FIG. 2. Computing device 120 and sequence server 130 may have a similar structure and components that are similar to those described with respect to transformation server 110. As shown, transformation server 110 may include a processor 210, an input/output ("I/O") device 220, a memory 230 containing an operating system ("OS") 240 and a program 250. For example, transformation server 110 may be a single server or may be configured as a distributed computer system including multiple servers or computers that interoperate to perform one or more of the processes and functionalities associated with the disclosed embodiments. In some embodiments, transformation server 110 may further include a peripheral interface, a transceiver, a mobile network interface in communication with processor 210, a bus configured to facilitate communication between the various components of the transformation server 110, and a power source configured to power one or more components of transformation server 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), Wi-Fi™, ZigBee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, transformation server 110 may configured to remotely communicate with one or more other devices, such as computer device 120. According to some embodiments, transformation server 110 may utilize a dual-stage neural network pipeline to detect and recognize textual information.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Transformation server 110 may include one or more storage devices configured to store information used by processor 210 (or other components) to perform certain functions related to the disclosed embodiments. In one example, transformation server 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, transformation server 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, transformation server 110 may include memory 230 that may include one or more programs 250 to perform one or more functions of the disclosed embodiments. Moreover, processor 210 may execute one or more programs 250 located remotely from transformation server 110. For example, transformation server 110 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include an image processing database 260 and a neural-network pipeline database 270 for storing related data to enable transformation server 110 to perform one or more of the processes and functionalities associated with the disclosed embodiments.

Transformation server 110 may also be communicatively connected to one or more memory devices (e.g., databases (not shown)) locally or through a network. The remote memory devices may be configured to store information and may be accessed and/or managed by transformation server 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Transformation server 110 may also include one or more I/O devices 220 that may include one or more interfaces for receiving signals or input from devices and providing signals or output to one or more devices that allow data to be received and/or transmitted by transformation server 110. For example, transformation server 110 may include interface components, which may provide interfaces to one or more input devices, such as one or more keyboards, mouse devices, touch screens, track pads, trackballs, scroll wheels, digital cameras, microphones, sensors, and the like, that enable transformation server 110 to receive data from one or more users (such as via computing device 120).

In example embodiments of the disclosed technology, transformation server 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While transformation server 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Figure 3:
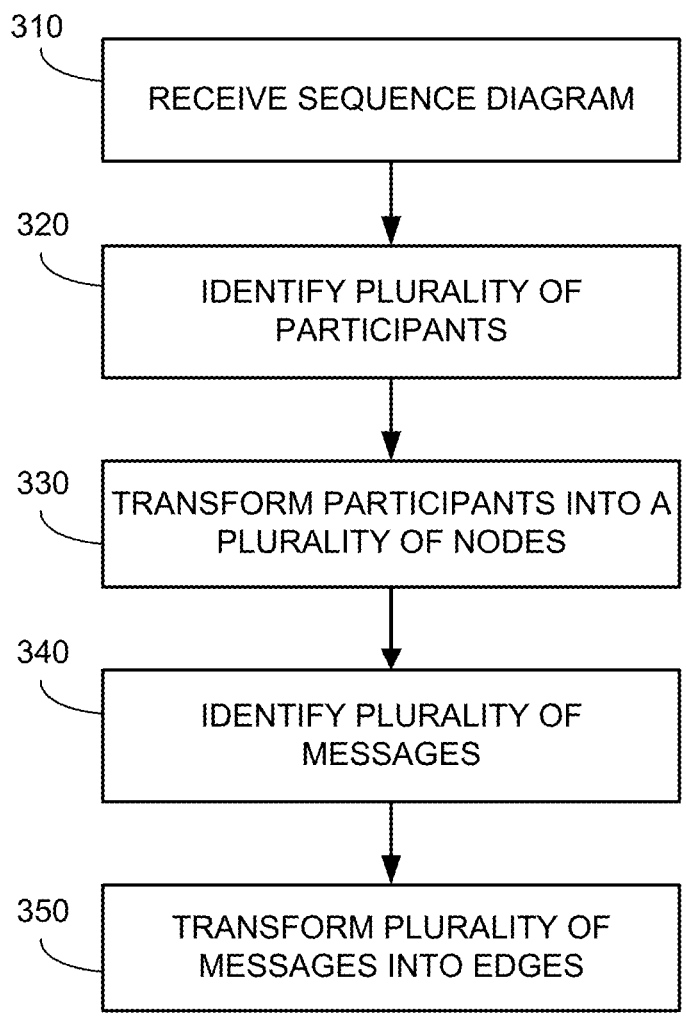
FIG. 3 is a flowchart of a method of transforming a sequence diagram according to an example embodiment.

FIG. 3 shows a flowchart of a method 300 for transforming a sequence diagram according to an example embodiment. Method 300 may be performed by, for example, transformation server 110.

At 310, transformation server 110 receives data corresponding to a sequence diagram. For example, transformation server 110 may retrieve source code for a sequence diagram (e.g., Unified Modeling Language (UML) or PlantUML source code) from sequence server 130. Transformation server 110 may crawl sequence server 130 to identify sequence diagrams stored thereon. In some cases, a user of computing device 120 may direct transformation server 110 to the sequence diagram, or may provide source code of the sequence diagram to the transformation server 110. In some cases, sequence server 130 may provide the sequence diagram to transformation server 110.

At 320, transformation server 110 identifies a plurality of participants within the sequence diagram. For example, transformation server 110 may parse source code of the sequence diagram (e.g., PlantUML source code) to identify the plurality of participants. In some instances, a grammatical representation of the source code (e.g., definitions and conventions) may be used to identify the plurality of participants and additional features. For example, PlantUML supports labeling of participants with spotted characters in a colored circle (see, e.g., FIGS. 11A-12B) with the following syntax: participant "A"<<(X,#000000) zoneA>>. In some cases, the transformation server 110 may recognize the color code for the circle (e.g., #000000), and apply the color code to the corresponding node. According to certain implementations, the labeling may be used to group nodes in the, for example, colored boxes having a same color as the circle tag. In some cases, transformation server 110 may perform image analysis and/or character recognition on the sequence diagram to identify the plurality of participants. In some instances, the image analysis may recognize colors (e.g., of participants) and apply the colors to the corresponding nodes. At 330, transformation server 110 transforms the identified participants into nodes of an architecture diagram. Transformation server 110 may identify, within sequence server 130, one or more documents corresponding to one or more participants of the sequence diagram. Transformation server 110 may link the one or more documents to the corresponding one or more nodes, such that, as a non-limiting example, the document may be viewed through the architecture diagram. In some cases, transformation server 110 may identify one or more notes within the source code corresponding to one or more participants of the sequence diagram. These notes may be linked to the corresponding one or more nodes, such that, as a non-limiting example, the notes may be viewed through the architecture diagram. For example, when a user "selects" or "hovers" over a particular node, the notes corresponding to the node (e.g., the corresponding participant) may be displayed (e.g., in a popup window). In some implementations, sequence diagram notes may utilize a first notation (e.g., UML, such as "\n" for a new line) while architecture view may utilize a second notation (e.g., HTML, such as "<br>" for a new line). Accordingly, in some cases, the first notation may be translated to the second notation.

At 340, transformation server 110 identifies a plurality of messages within the sequence diagram. For example, transformation server 110 may parse source code of the sequence diagram (e.g., PlantUML source code) to identify the plurality of messages, or perform image analysis and/or character recognition on the sequence diagram to identify the plurality of messages. In some cases, transformation server 110 may identify one or more notes within the source code corresponding to one or more messages of the sequence diagram. These notes may be linked to the corresponding one or more edges, such that, as a non-limiting example, the notes may be viewed through the architecture diagram. For example, when a user "selects" or "hovers" over a particular edge, or selects a particular message in a message list, the notes corresponding to the edge (e.g., the corresponding message) may be displayed (e.g., in a popup window). In some cases, the messages and/or message arrows may have designated colors. In these cases, the color may be represented in the corresponding edge and/or corresponding message in the message list associated with the architecture diagram. In some circumstances, the plurality of messages may include one or more message groups. The message groups may be used to subdivide messages within a message list (see, e.g., FIGS. 13A-13C), for example, by utilizing message list item headings, indenting messages beneath a message group, or boxing messages within a message group. In some cases, the plurality of messages may include one or more loops (e.g., if-then, do while). The loops may be represented within a message list, for example, by boxing messages within a message loop, placing an arrow connecting first and last messages within a message loop, highlighting (e.g., with font or color) the message loop, and/or animating through the messages within a message loop (e.g., when a loop is selected). At 350, transformation server 110 transforms the plurality of messages into edges of the architecture diagram, thereby generating the architecture diagram.

In some implementations, transformation server 110 may first transform the sequence diagram (e.g., sequence diagram source code) into an intermediate format. This intermediate format may be used to draw the architecture diagram, which provides an interactive architecture diagram. For example, if a sequence diagram is written in PlantUML source code, transformation server 110 may transform the source code into a JSON format, which can be used by a web-browser of computing device 120 to draw the architecture diagram in a static HTML page.

Figure 4:
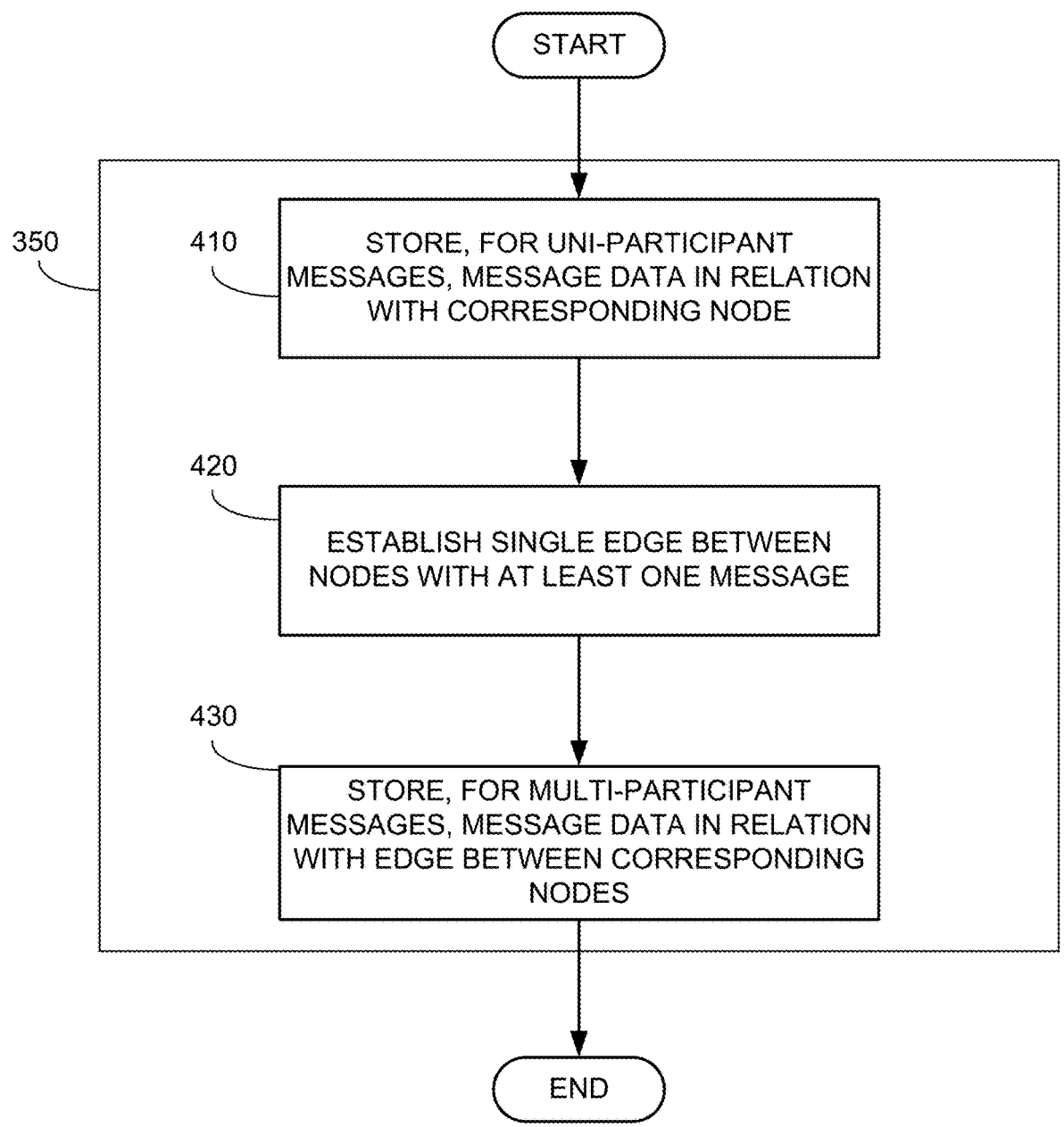
FIG. 4 is a flowchart of a method of transforming messages of a sequence diagram according to an example embodiment.

FIG. 4 shows a flowchart of transforming the plurality of messages 350 according to an example embodiment. One of ordinary skill will recognize that this is merely an example. At 410, transformation server 110 stores message data, for each single-participant (e.g., self-referential) message of the plurality of messages, with the corresponding node. Accordingly, for single-participant messages, no edge is created, but the corresponding node in the architecture diagram is modified.

At 420, transformation server 110 established a single edge between nodes corresponding to participants that share at least one message. For example, if a single Message 1 goes from Participant A to Participant B in the sequence diagram, a single edge will connect Node A to Node B in the architecture diagram. Similarly, if Messages 2-4 go between Participant B and Participant C, a single edge will connect Node B and node C in the architecture diagram.

At 430, transformation server 110 stores message data corresponding to multi-party messages (e.g., messages between two participants) in relation to the single edge connecting the corresponding nodes. Referring again to the foregoing example, message data of Message 1 will be stored in connection with the edge connecting Node A and Node B, and message data of Messages 2-4 will be stored in connection with the edge connection Node B and node C. In some cases, a width of the single edge may correspond to a number of messages between two nodes.

Figure 5:
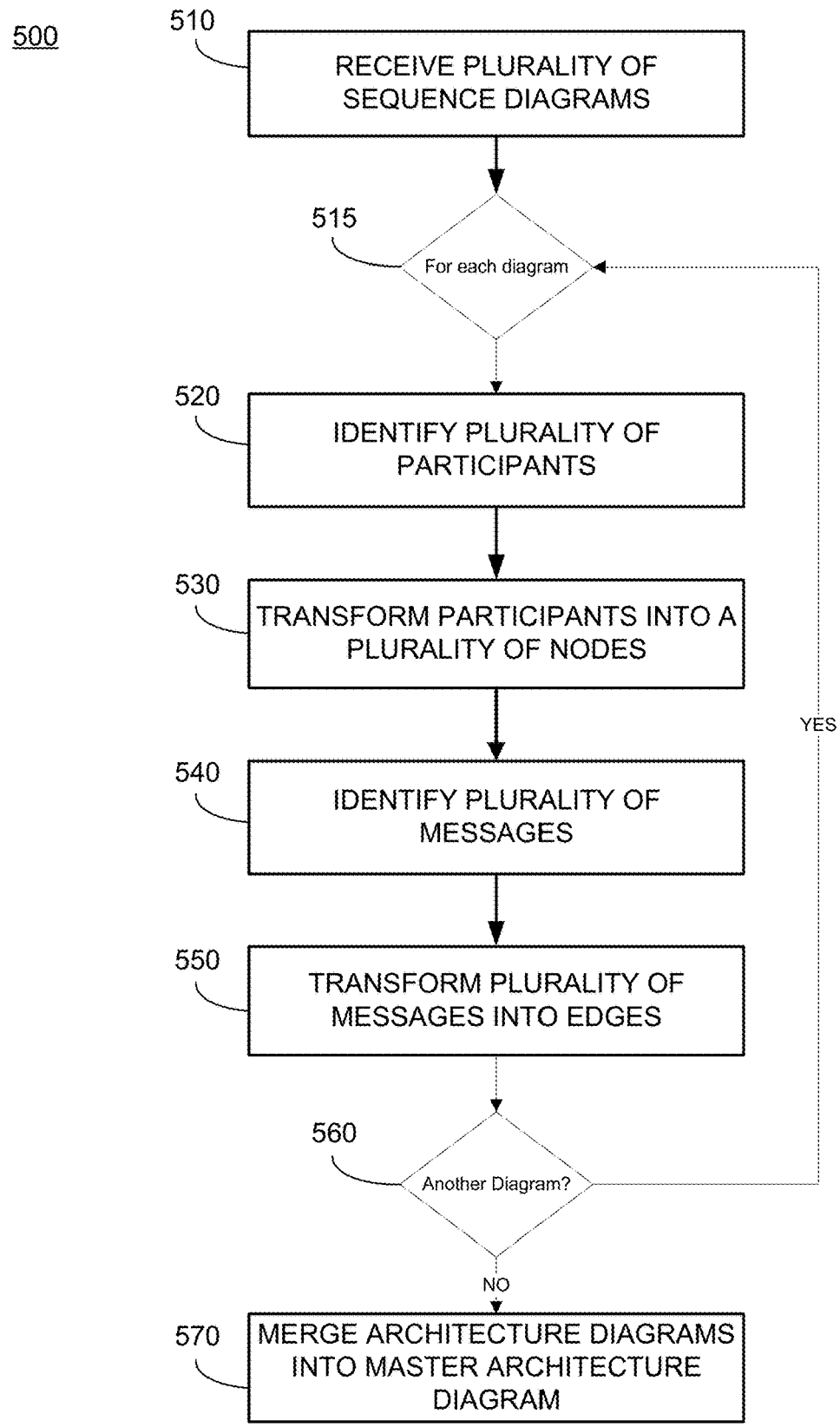
FIG. 5 is a flowchart of a method of transforming a plurality of sequence diagrams according to an example embodiment.

FIG. 5 shows a flowchart of a method 500 for transforming a plurality of sequence diagrams according to an example embodiment. Method 500 may be performed by, for example, transformation server 110.

At 510, transformation server 110 receives data corresponding to a plurality of sequence diagrams. At 515, transformation server 110 begins a process of transforming each of the plurality of sequence diagrams into a respective architecture diagram. One of ordinary skill will recognize that transforming each of the plurality of sequence diagrams may be done sequentially, in parallel, and/or asynchronously. At 520, transformation server 110 identifies a plurality of participants within a particular sequence diagram. At 530, transformation server 110 transforms the identified participants into nodes of an architecture diagram. At 540, transformation server 110 identifies a plurality of messages within the specific sequence diagram. At 550, transformation server 110 transforms the plurality of messages into edges of the architecture diagram, thereby generating the architecture diagram. The method elements at 510 and 520-550 may be substantially similar to 310-350 discussed above with reference to FIG. 3.

At 560, transformation server 560 determines whether another sequence diagram has yet to be transformed. If a sequence diagram has not been transformed into an architecture diagram (560—Yes), transformation server 520 identifies participants, generates nodes, identifies messages, and generates edges for the remaining sequence diagrams. If no sequence diagram is awaiting transformation (560—No), transformation server 110 generates a master architecture diagram. That is, at 570, transformation server 110 merges the plurality of architecture diagrams generate from the plurality of sequence diagrams into a master architecture diagrams.

Figure 6:
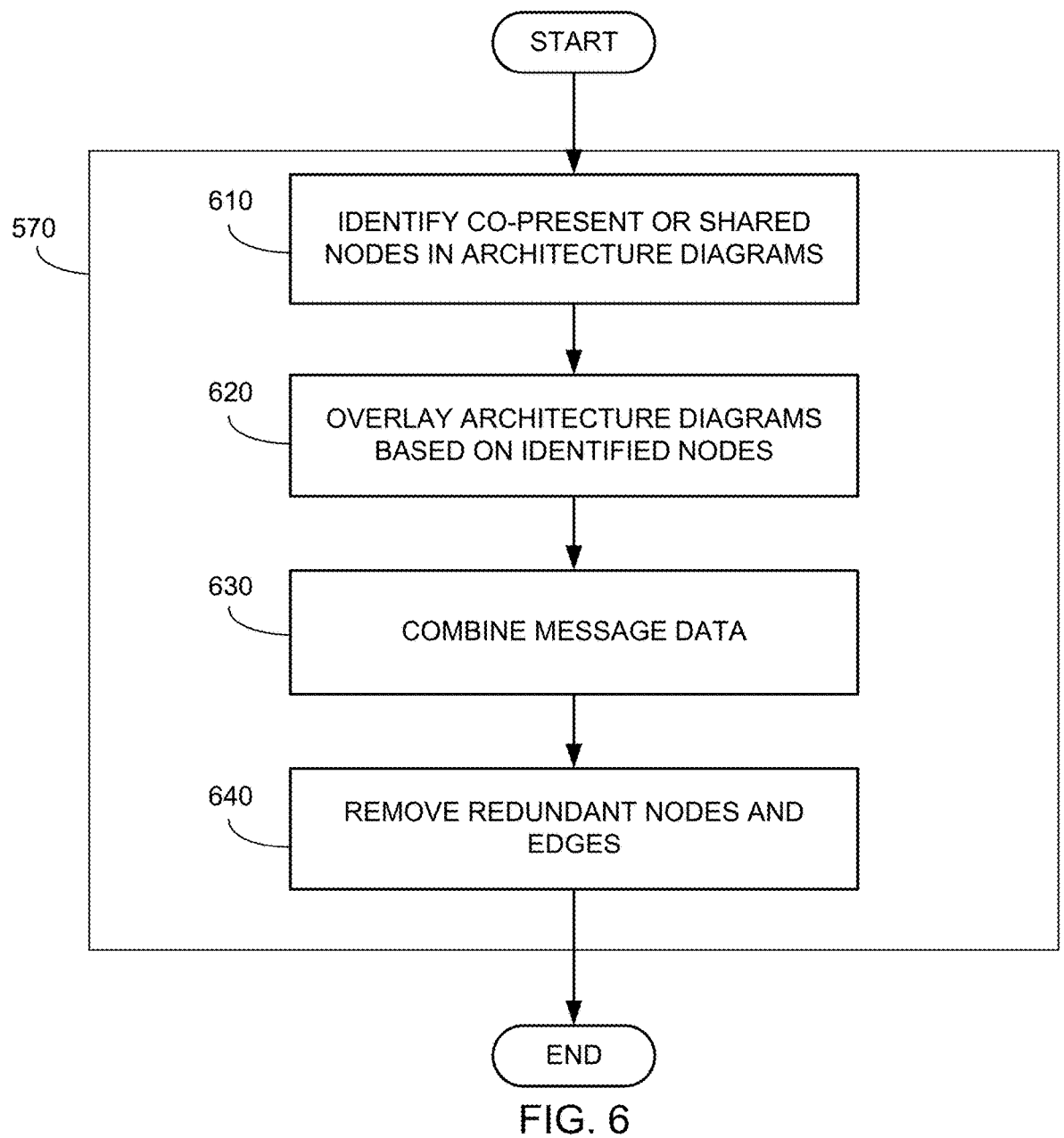
FIG. 6 is a flowchart of a method of merging architecture diagrams according to an example embodiment.

FIG. 6 shows a flowchart of merging the plurality of architecture diagrams into a master architecture diagram 570 according to an example embodiment. At 610, transformation server 110 identifies, between two or more architecture diagrams, one or more co-present or shared nodes. For example, transformation server 110 may identify nodes in two different architecture diagrams having a same name and belonging to a same entity. At 620, transformation server overlays the architecture diagrams based on the identified co-present or shared nodes. At 630, transformation server 110 combines overlaid node and edge data. At 640, transformation server 110 removes redundant nodes and edges from the overlaid architecture diagrams, thus forming the master architecture diagram. In some implementations, a dropdown list may be provided where one or more sequence diagrams (i.e., sub-master architecture diagrams) may be selected for inclusion in a current "view" of the architecture diagram. Thus, a user may select which sequence diagrams he or she would like to view in a master diagram, allowing a user to move between different scopes, and growing up to and/or shrinking from the full architectural view.

Figure 7:
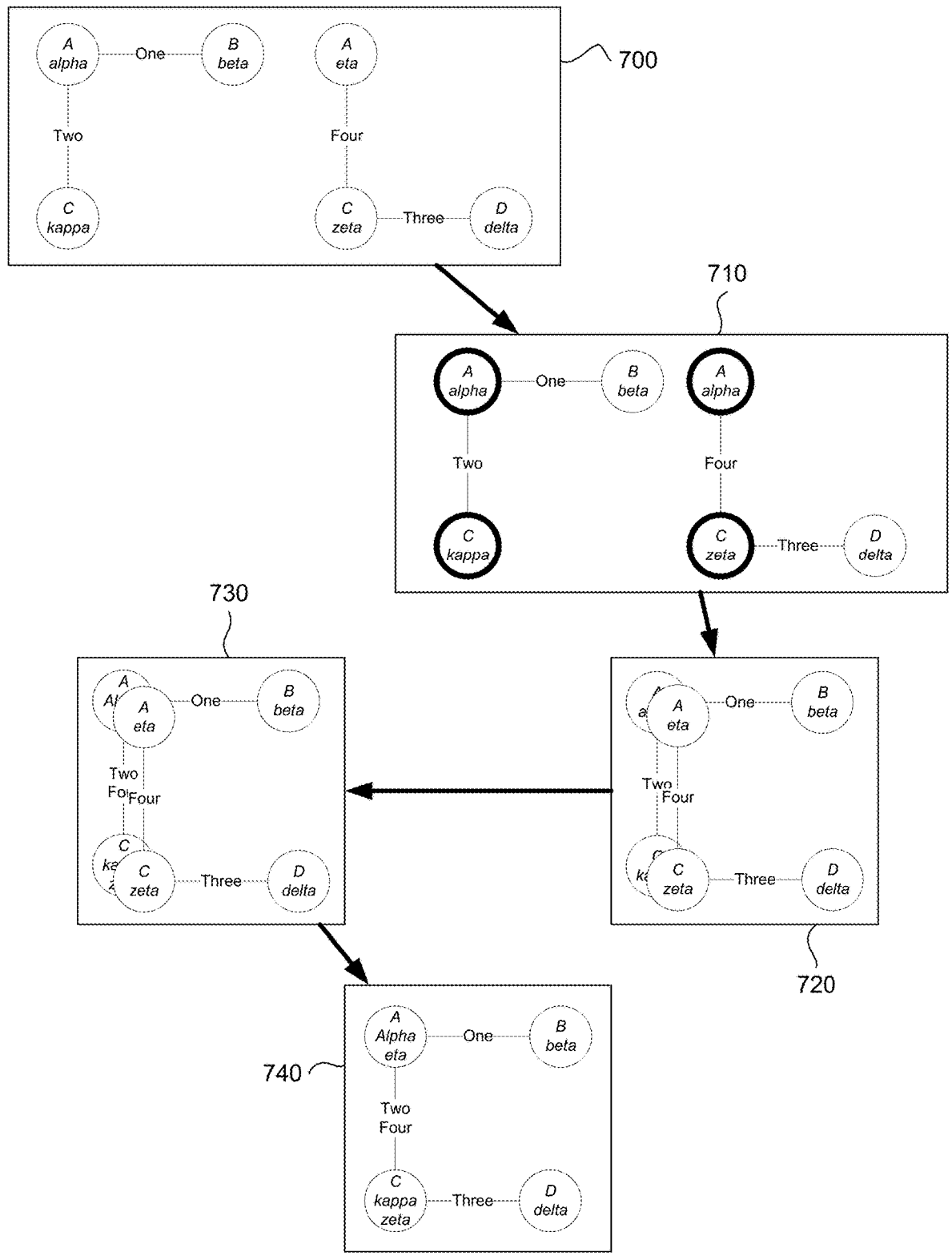
FIG. 7 illustrates a non-limiting example of merging two architecture diagrams to generate a master architecture diagram.

FIG. 7 illustrates a non-limiting example of merging two architecture diagrams to generate a master architecture diagram. As seen in 700, a first architecture diagram has Nodes A, B, and C, with edges connecting Node A to Node B and Node A to Node C, and a second architecture diagram with Nodes A, C, and D, with edges connecting Node A to Node C and Node C to Node D. At 710, Nodes A and C are recognized as existing in both the first and second architecture diagram. In 720, first architecture diagram overlays the second architecture diagram. In 730, all overlapping node and edge data are merged. In 740, the redundant nodes and edge are removed, creating the master architecture diagram including one of each of Nodes A, B, C, and D, and single edges connecting Node A to Node B, Node A to Node C, and Node C to Node D.

Figure 8:
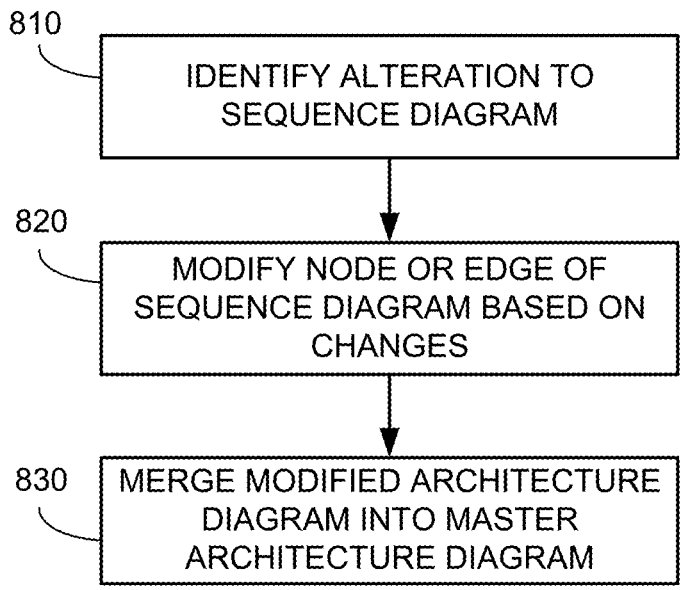
FIGS. 8 and 9 are flowcharts of methods and for maintaining a master architecture diagram according to some example embodiments.
Figure 9:
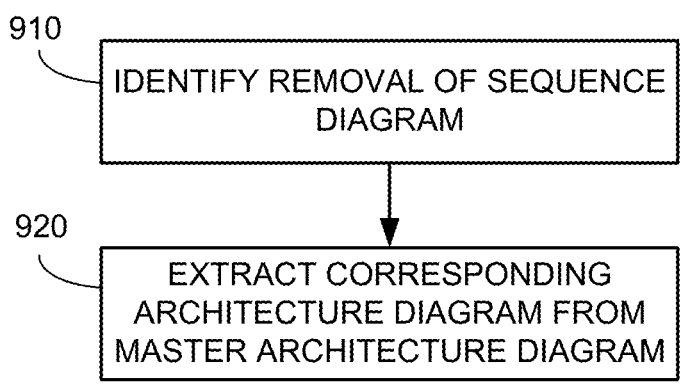

FIGS. 8 and 9 show flowcharts of methods 800 and 900 for maintaining a master architecture diagram according to some example embodiments. Methods 800 and 900 may be performed by, for example, transformation server 110.

Referring to FIG. 8, at 810, transformation server 110 identifies an alteration to one or more sequence diagrams within the sequence server 130. For example, transformation server 110 may maintain a record of transformation dates for each transformed sequence diagram, and monitor the sequence server 130 for later updates (e.g., by checking last save times). In some cases, sequence server 130 may notify transformation server 110 of updates and/or maintain a change log.

At 820, transformation server modifies the corresponding architecture diagram based on changes to the sequence diagram. For example, in a new participant is added, transformation server 110 adds a node to the architecture diagram. At 830, transformation server 110 merges the modified architecture diagram into the master architecture diagram. For example, transformation server 110 may add nodes corresponding to new participants, add or remove node data corresponding to a node previously existing in the master architecture diagram, add new edges corresponding to new messages, or add or remove edge data corresponding to an edge previously existing in the master architecture diagram.

Referring to FIG. 9, at 910, transformation server 110 identifies a removed (e.g., deleted) sequence diagram. For example, transformation server 110 may maintain a record of transformed sequence diagrams and their locations, and monitor the sequence server 130 to determine a removal (e.g., the sequence diagram is no longer present in sequence server 130).

At 920, transformation server 110 extracts the architecture diagram corresponding to the removed sequence diagram from the master architecture diagram. For example, any nodes of the architecture diagram of the deleted sequence diagram that do not exist in another architecture diagram are removed from the master architecture diagram. Similarly, any edges of the architecture diagram of the deleted sequence diagram that do not exist in another architecture diagram are removed from the master architecture diagram. For edges and nodes of the architecture diagram of the deleted sequence diagram that exist within the other architecture diagrams, node and edge data of the architecture diagram of the deleted sequence diagram are removed.

In some implementations, changes to one sequence diagram of a plurality of sequence diagrams may be identified and selectively carried through the remaining sequence diagrams. For example, if two sequence diagrams (One and Two) have a same participant A, the corresponding architecture diagrams will connect at node A in the master architecture diagram. If the One sequence diagram is modified to rename the participant A', the system may identify this change and provide a user-option to modify the Two sequence diagram to also rename the participant A'. In some cases, up to all changes to one or more sequence diagrams may be identified when updating the master architecture diagram, and a collection of those changes may be presented to a user for acceptance, integration, and/or modifying the sequence diagrams.

Figure 10:
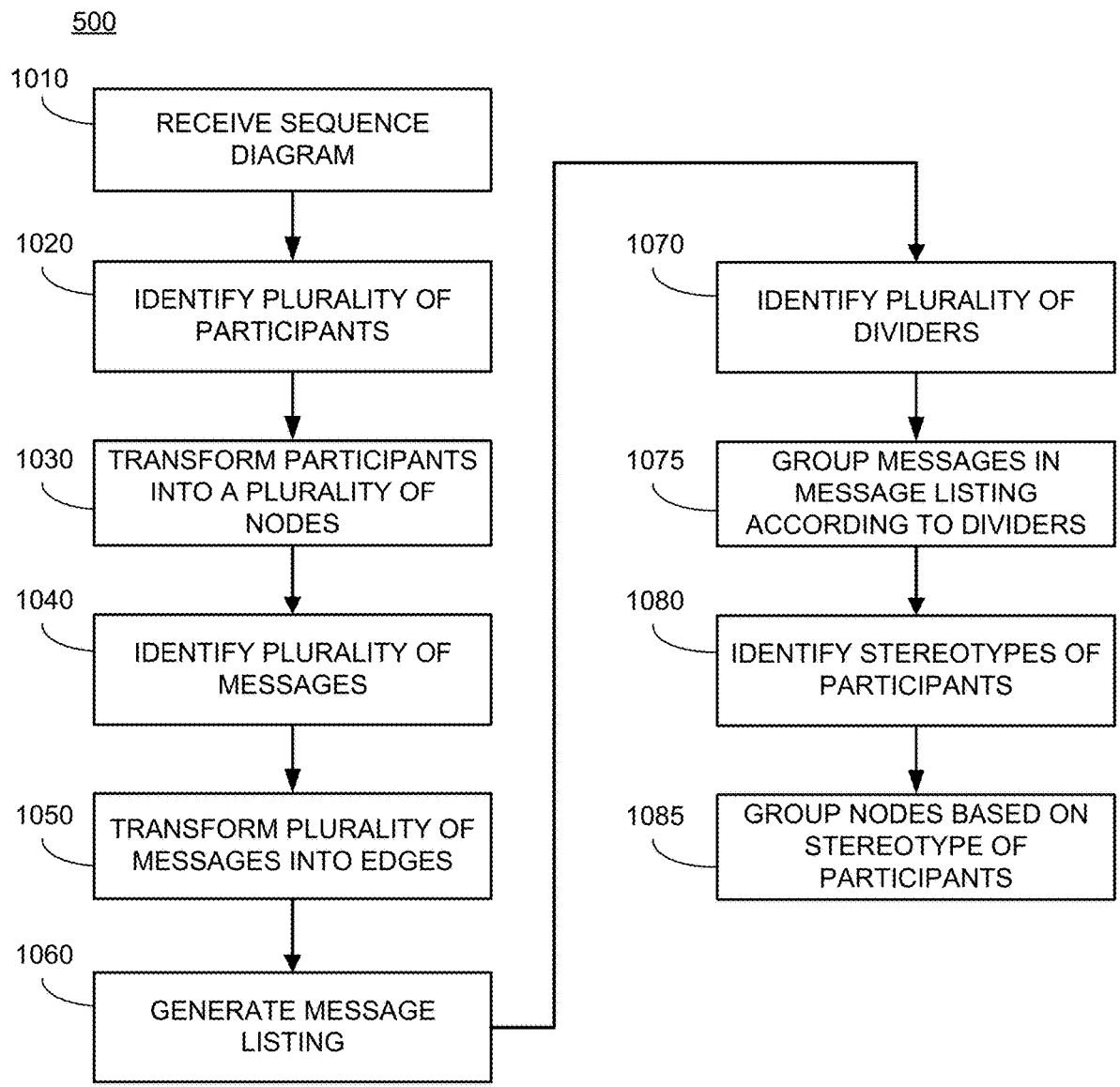
FIG. 10 is a flowchart of a method of transforming a sequence diagram according to an example embodiment.

FIG. 10 shows a flowchart of a method 1000 for transforming a sequence diagram according to another example embodiment. Method 1000 may be performed by, for example, transformation server 110.

At 1010, transformation server 110 receives data corresponding to a sequence diagram. At 1020, transformation server 110 identifies a plurality of participants within the sequence diagram. At 1030, transformation server 110 transforms the identified participants into nodes of an architecture diagram. At 1040, transformation server 110 identifies a plurality of messages within the sequence diagram. At 1050, transformation server 110 transforms the plurality of messages into edges of the architecture diagram. The method elements at 1010-1050 may be substantially similar to 310-350 discussed above with reference to FIG. 3.

At 1060, transformation server 110 may generate a message listing from the identified plurality of messages. Items within the message listing may be hot-linked to the nodes and edges corresponding to respective messages.

At 1070, transformation server 110 may identify, within the sequence diagram, a plurality of dividers separating out the identified messages. For example, transformation server 110 may parse source code of the sequence diagram (e.g., PlantUML source code) to identify the plurality of dividers. In some cases, transformation server 110 may perform image analysis and/or character recognition on the sequence diagram to identify the dividers. At 1075, transformation server 110 groups the items in the message list in accordance with the dividers associated with the respective messages.

At 1080, transformation server 110 may identify, within the sequence diagram, a stereotype associated with each of the plurality of participants. For example, transformation server 110 may parse source code of the sequence diagram (e.g., PlantUML source code) to identify the stereotypes. In some cases, transformation server 110 may perform image analysis and/or character recognition on the sequence diagram to identify the stereotypes. At 1085, transformation server 110 groups the plurality of nodes in accordance with the associated stereotypes.

Figure 11A:
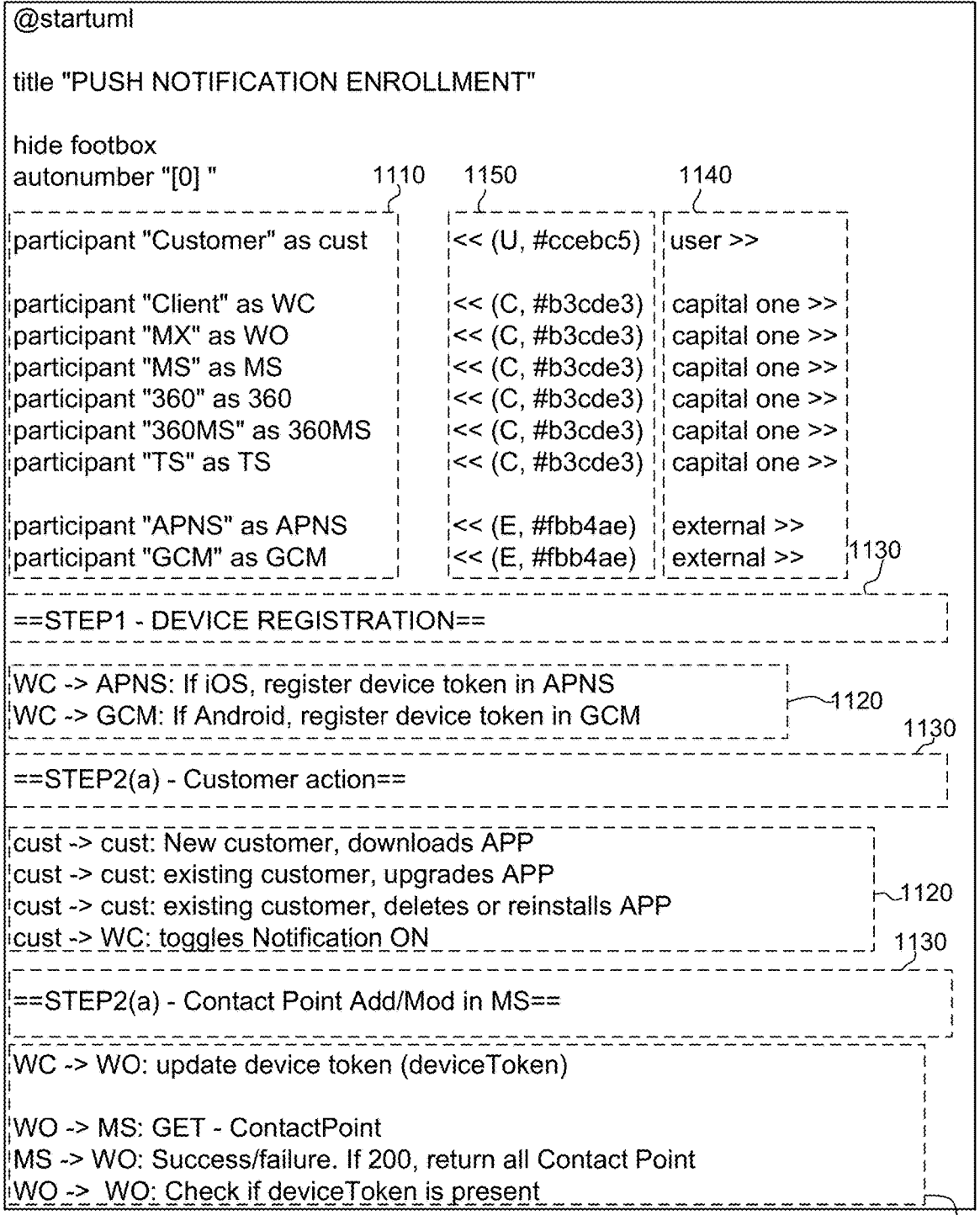
FIGS. 11A and 11B are example excerpts of a sequence diagram source code.
Figure 11B:
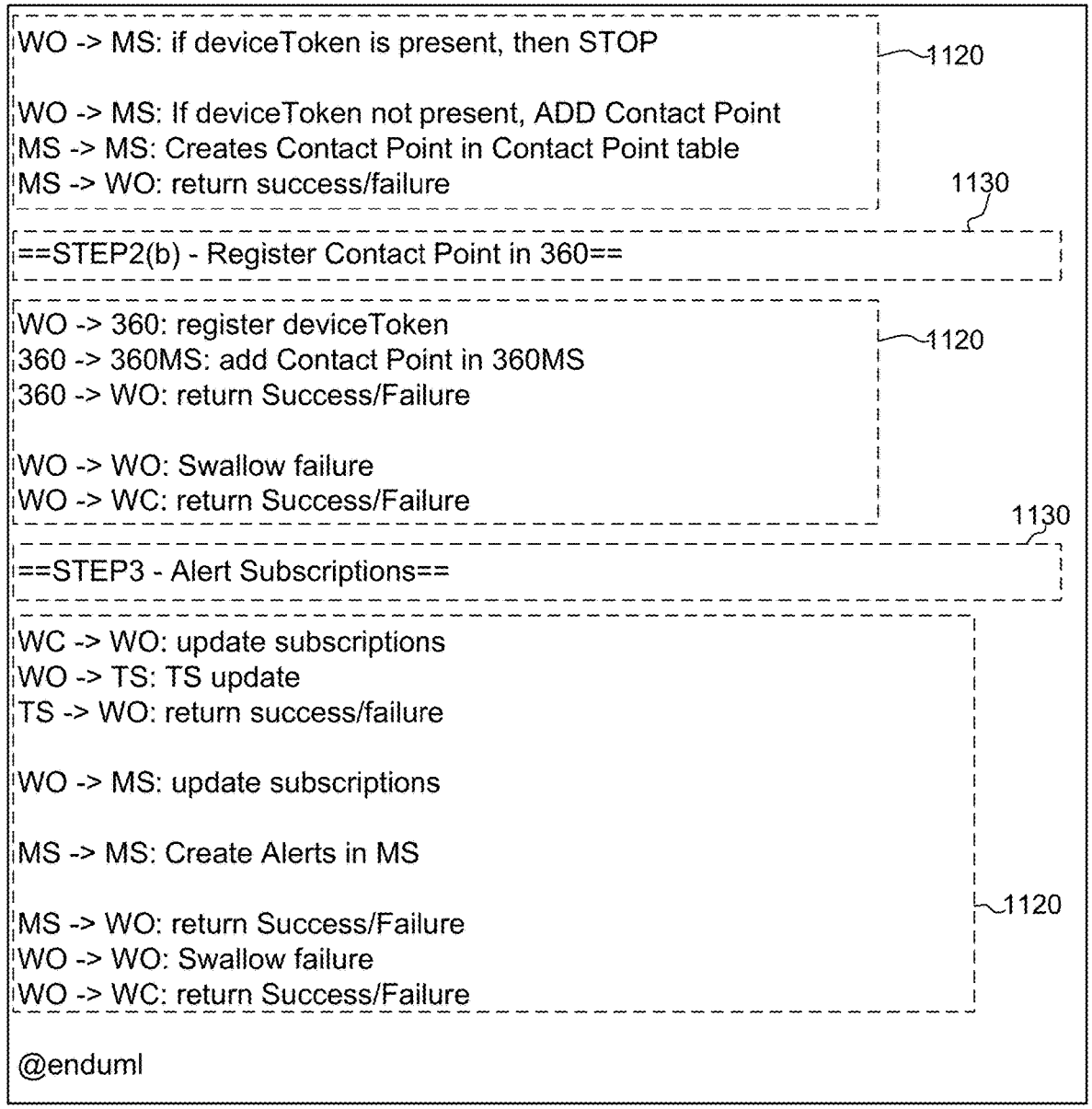
Figure 12A:
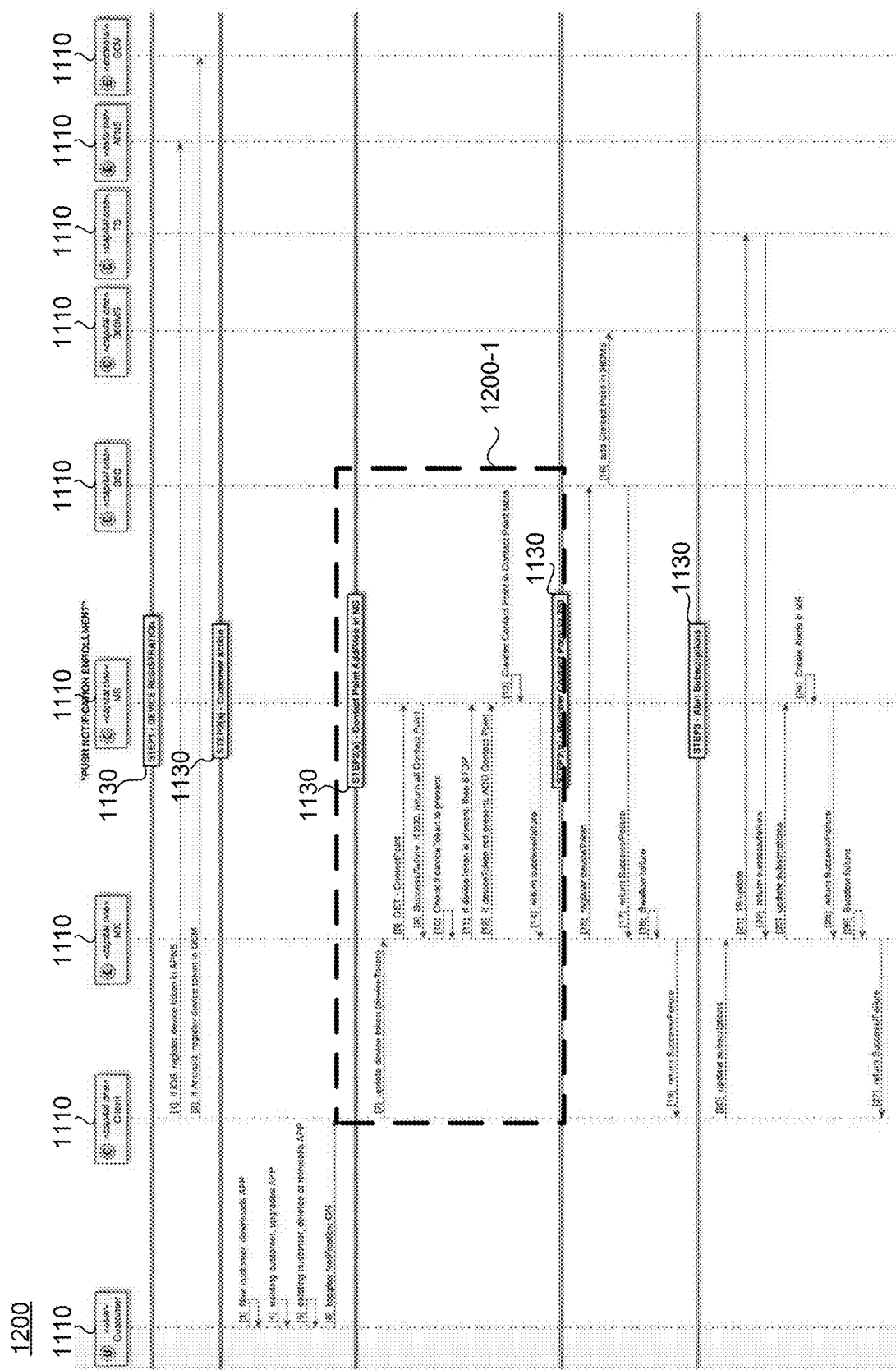
FIG. 12A is an example sequence diagram.
Figure 12B:
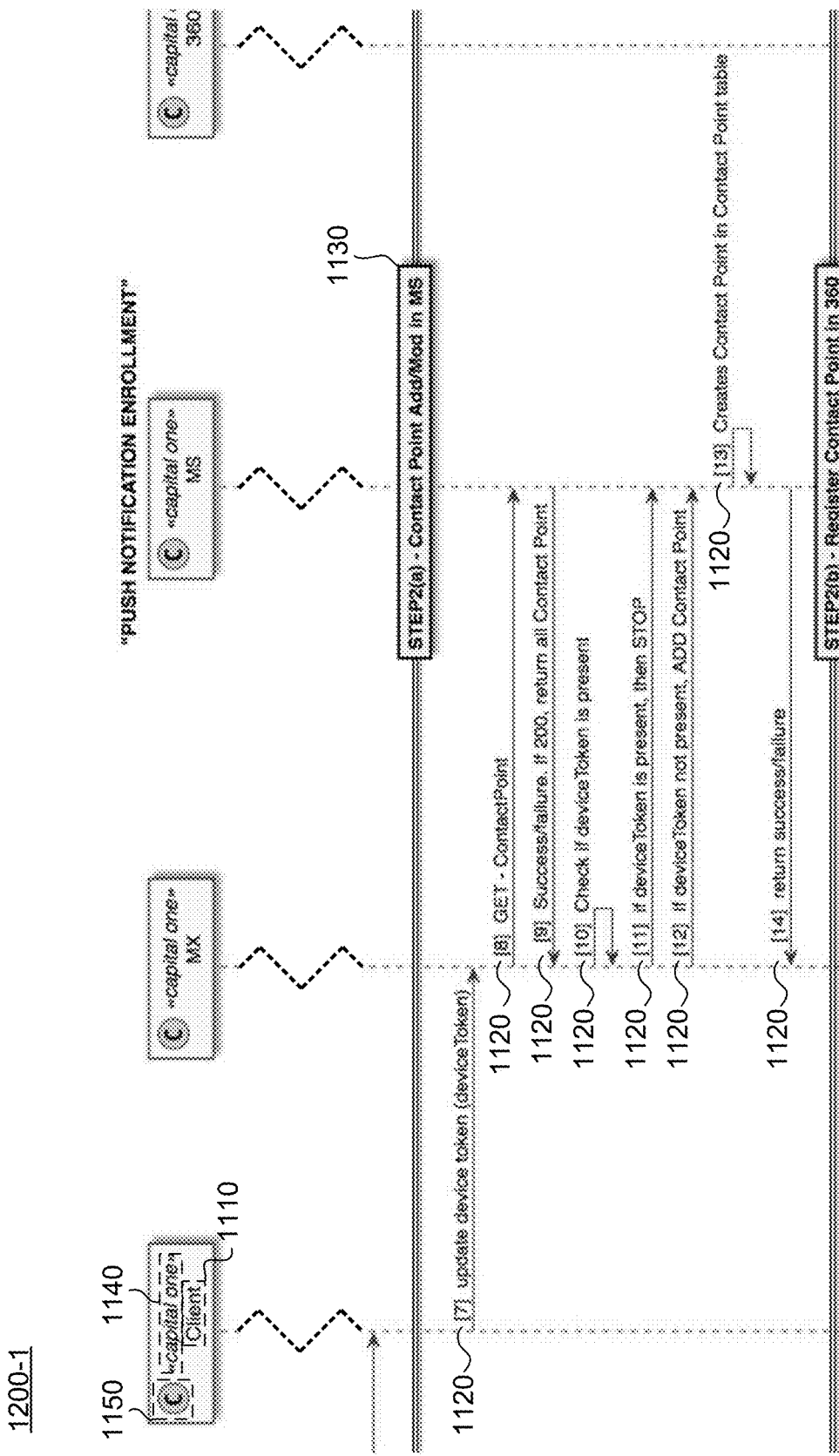
FIG. 12B is an excerpt of an example sequence diagram

FIGS. 11A and 11B illustrates example sequence diagram source code 1100a and 1100b according to an example embodiment. The source code 1100a and 1100b defines participants 1110, messages 1120, dividers 1130, stereotypes 1140, and tags 1150. FIGS. 12A and 12B illustrate an example sequence diagram 1200 and excerpt 1200-1 corresponding to the source code 1100 of FIG. 11. Accordingly, sequence diagram 1200 and 1200-1 includes illustrates participants 1210, messages 1220, dividers 1230, stereotypes 1240, and tags 1250.

Figure 13A:
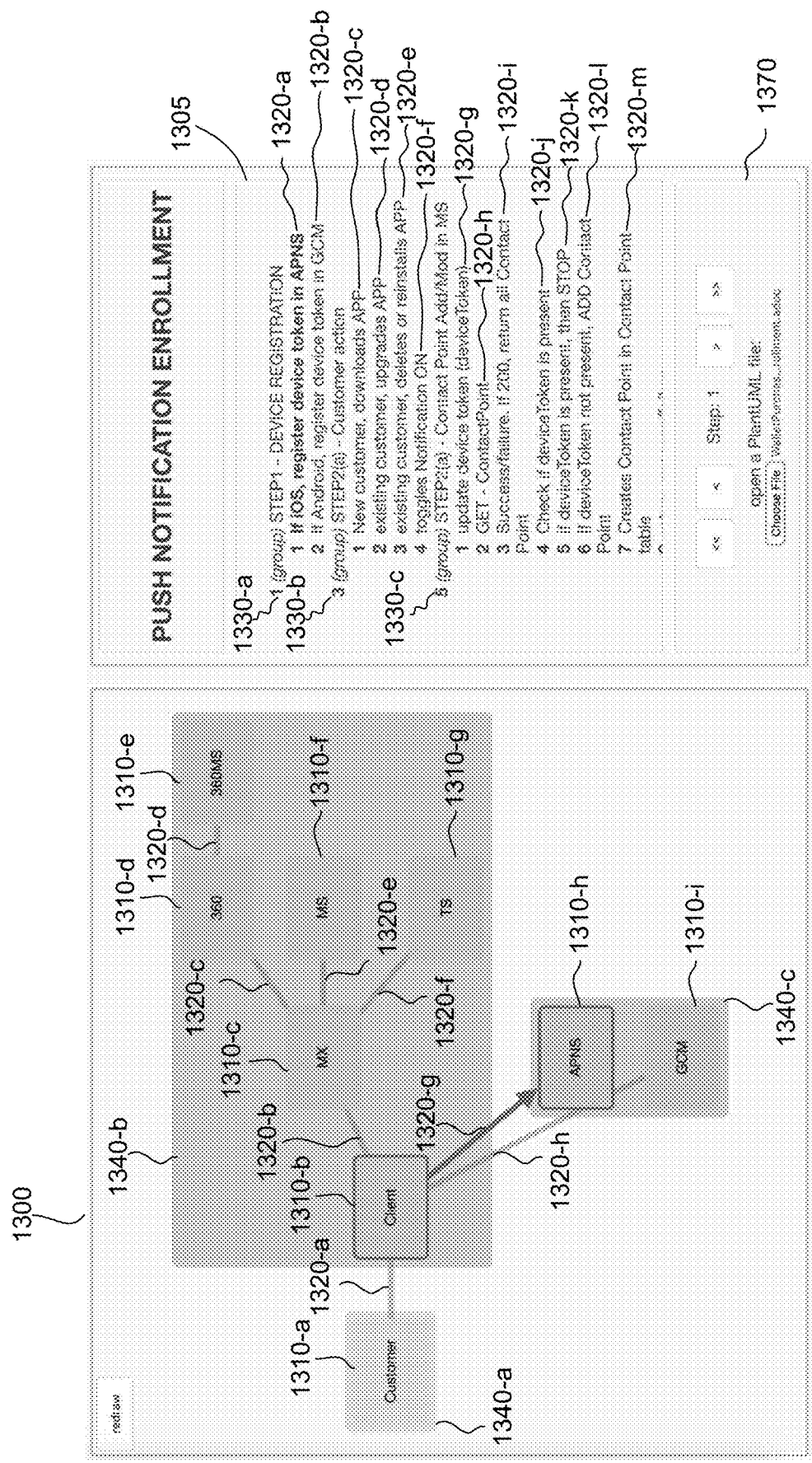
FIGS. 13A-13C illustrate architecture diagrams and linked message lists according to example embodiments.
Figure 13B:
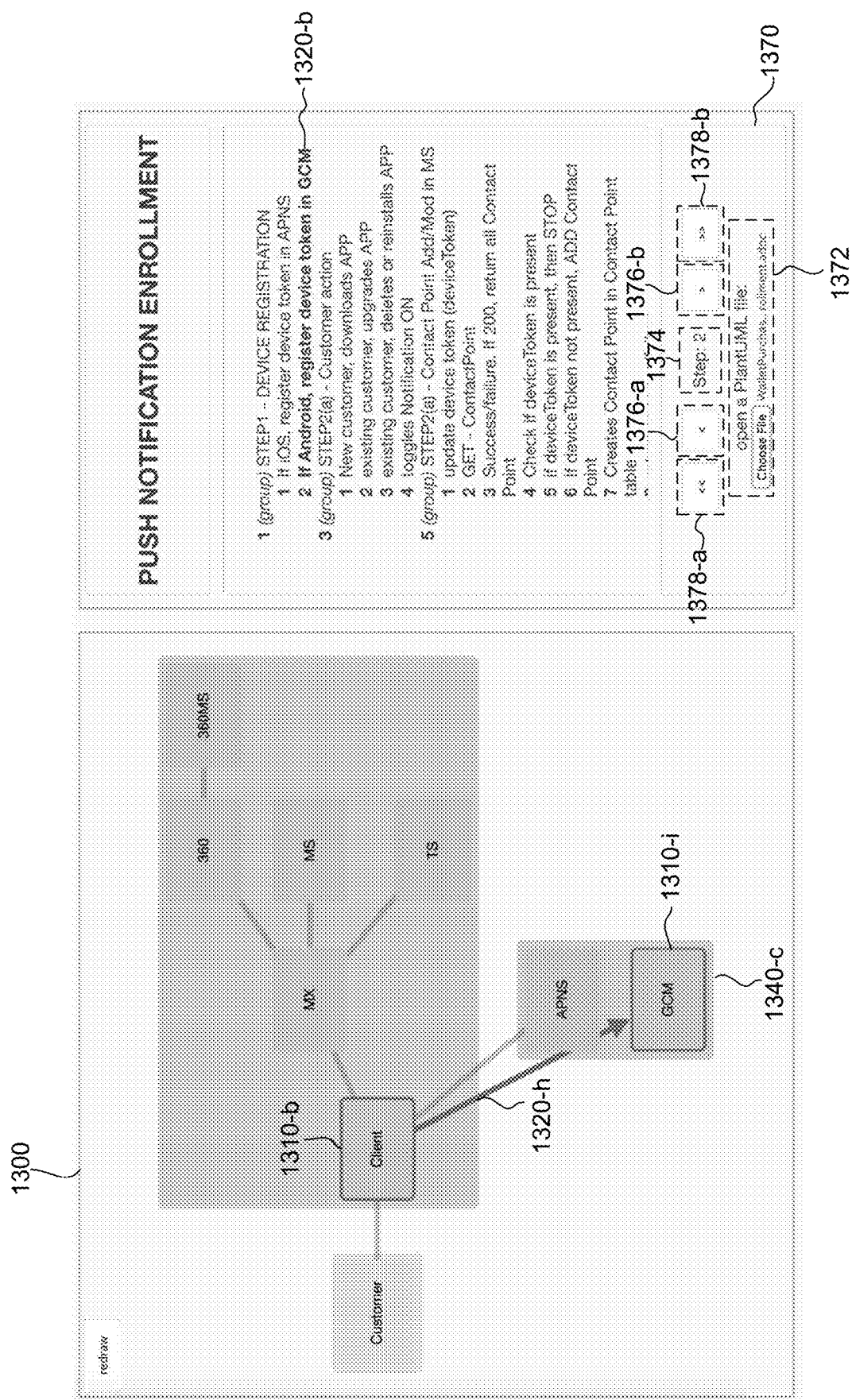
Figure 13C:
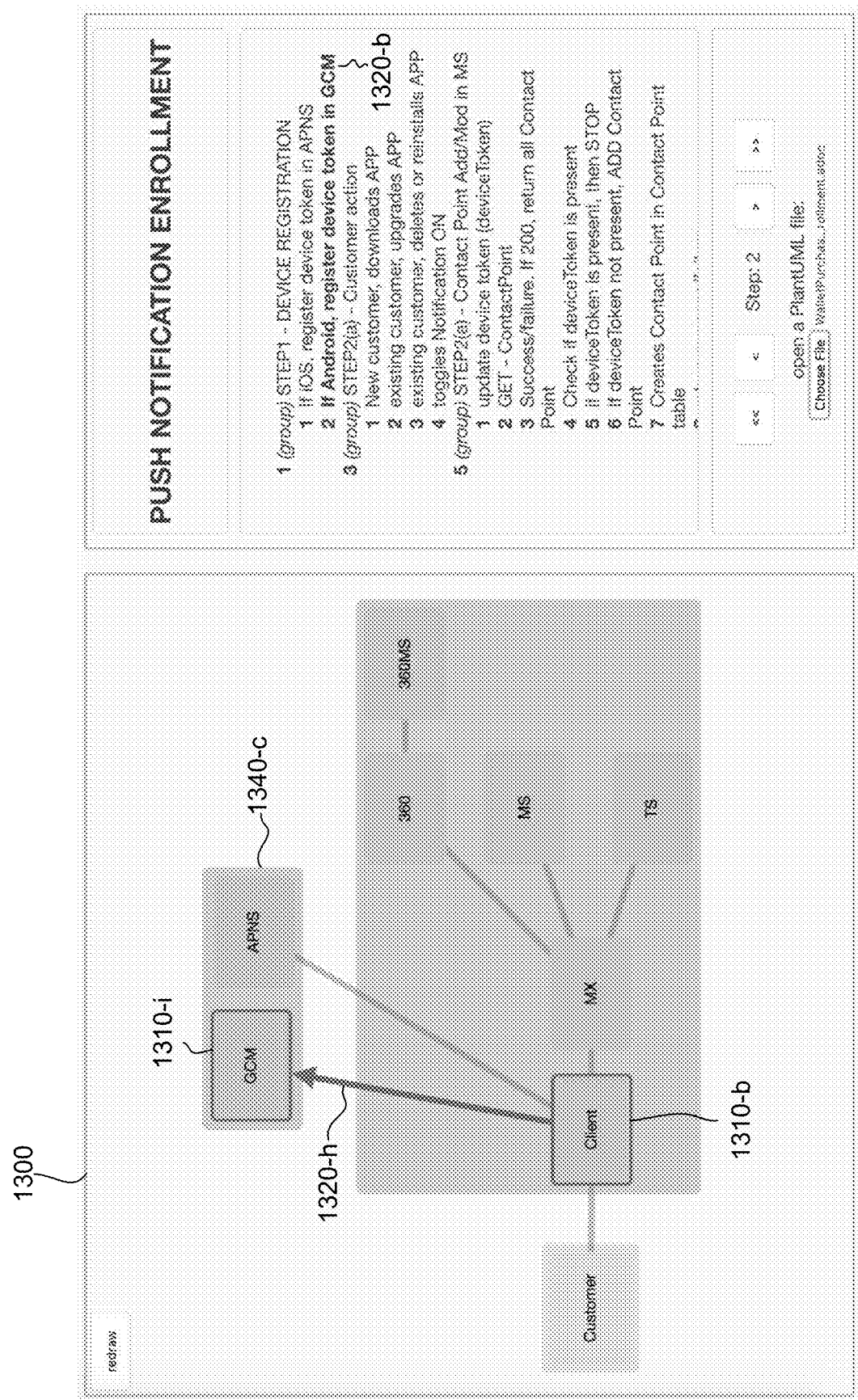

FIGS. 13A-13C illustrate various views and configurations of an architecture diagram 1300 and a message list 1305 of the transformed sequence diagram 1200. As can be seen, the architecture diagram includes nodes 1310-*a*-1310-*i* corresponding to each participant 1110 of sequence diagram 1100/1200, single edges 1320-*a*-1320-*h* connecting various nodes 1310-*a*-1310-*i* corresponding to multi-participant messages 1120, and the nodes being grouped 1340-*a*-1340-*c* based on stereotype 1140. Message list 1305 includes a plurality of message items 1320-*a*-1320-*m* corresponding to each message 1120 of sequence diagram 1100/1200. The message items 1320-*a*-1320-*m* are grouped 1330-*a*-1330-*c* corresponding to in accordance with the dividers 1130. FIGS. 13A-13C further illustrate a user interface 1370.

In FIG. 13A, a first message item 1320-a is selected from the message list 1305. The first message item 1320-a may be selected through, for example, click-selection (e.g., using a mouse or touch-screen input), keyboard navigation (e.g., using arrow-keys of a keyboard), or through a provided user interface (e.g., user interface 1370). As the message items are linked to the architecture diagram, selecting the first message item 1320-a triggers emphasis of the corresponding nodes 1310-b and 1310-hand edge 1320-g. As illustrated in FIG. 13A, message item 1320-a, nodes 1310-b and 1310-h, and edge 1320-g are bolded. Moreover, edge 1320-g is transformed with a directional indicator in accordance with the message direction of the message item 1320-a. One of ordinary skill will recognize that this is merely an example, and nodes and edges may be emphasized in a variety of ways (e.g., by muting non-selected/corresponding messages, nodes, and edges).

In some cases, a node (e.g., node 1310-a) may be selected, and corresponding edges (e.g., edge 1320-a) and message items (e.g., 1320-f) may be similarly highlighted. Likewise, if an edge (e.g., edge 1320-a) is selected in architecture diagram 1300, the corresponding nodes (e.g., 1310-a and 1310-b) and relevant message items (e.g., 1320-f) corresponding to the selected edge may be emphasized. In some cases, one or more documents corresponding to participants of the sequence diagram may be identified. Selecting a node corresponding to the participant may trigger automatic retrieval and display of the document. For example, the nodes may be hot-linked to specific documents, and selecting a node may launch the document. In some cases, document information may be extracted from the document (e.g., text and figures), and the corresponding texts and figures may be displayed and/or selected to be displayed in response to selecting a given node.

One of ordinary skill will understand that these are merely examples, and various additional or alternative transformations may be made to form a master architecture diagram. For example, self-referential (i.e., one-participant messages) may be represented by an arrow leading from and pointing to a same node. In some cases, images may be embedded within the architecture diagram (e.g., corresponding to authors of particular sequence diagrams and/or key personnel corresponding to particular nodes).

Referring to FIG. 13B, a second message item 1320-b is selected from the message list 1305. The second message item 1320-b may be selected through, for example, navigation using user interface 1370. As a non-limiting example, user interface 1370 includes file selection 1372, current selection name 1374, back and forward item navigation 1376-a and 1376-b, and back and forward group navigation 1378-a and 1378-b. Although user interface 1370 is illustrated in being utilized to navigate through message list 1305, this is merely an example. In some cases, a node (e.g., node 1310-b) may be selected, and the user interface 1370 may be used to navigate between one or more nodes and edges. As the message items are linked to the architecture diagram, selecting the second message item 1320-b triggers emphasis of the corresponding nodes 1310-b and 1310-i and edge 1320-h. As illustrated in FIG. 13B, message item 1320-b, nodes 1310-b and 1310-i, and edge 1320-h are bolded. Moreover, edge 1320-h is transformed with a directional indicator in accordance with the message direction of the message item 1320-b.

In some implementations, an entire message item group may be selected. In this case, all nodes and edges of the architecture diagram corresponding to message items of the selected message item group may be emphasized.

In FIG. 13C, the second message item 1320-b continues to be selected from the message list 1305, and nodes 1310-b and 1310-i and edge 1320-h are emphasized. From FIG. 13B to FIG. 13C, node group 1340-c has been moved. In particular, node group 1340-c has been moved to a top of architecture diagram 1300. Such movement may be user directed, for example through click and dragging of node group 1340-c. In some cases, user-input designs of an architecture diagram 1300 may be persisted in the corresponding sequence diagram 1100 (e.g., through notes or other designations).

In some cases, a user may make various modifications to one or more nodes, edges, node groups, message items, and/or message item groups directly through the architecture diagram 1300 and message list 1305, and the changes may be persisted in the corresponding sequence diagram 1100. For example, a user may edit the text of a message item, and the text change may be persisted in the corresponding message of the sequence diagram source code.

As discussed above, in some cases, a master architecture diagram may be formed from a plurality of sequence diagrams. The master architecture diagram may include nodes corresponding to all participants in all the sequence diagrams. Within and/or linked to the master architecture diagrams, there may be provided selectable indicators corresponding to specific sequence diagrams. In response to a selection of a specific sequence diagram, corresponding nodes and edges generated from the specific sequence diagram may be highlighted within the master architecture diagram. In some cases, selecting a specific sequence diagram may call-forth a message list corresponding to the selected sequence diagram. In some implementations selecting a specific sequence diagram may limit display of the architecture diagram to architecture (e.g., nodes and edges) corresponding to and/or directly connected with the particular sequence diagram.

In some cases, together with the master architecture diagram may be a master message list, grouping message items based on corresponding message sequences. Selection of a specific sequence diagram may emphasize the corresponding message items generated from the specific sequence diagram within the master message list.

In some cases, within and/or linked to the master architecture diagram may be selectable indicators of versions of specific sequence diagrams. For example, over time, new participants and messages may be added to a specific sequence diagram. Master architecture diagram may automatically update based on a selected version of specific sequence diagrams.

In some implementations, the logic and processes necessary to transform sequence diagram(s) into a (master) architecture diagram may be provided in, as non-limiting examples, a standalone application, as a static or dynamic web application (e.g., in a web browser), on a server (e.g., as a software-as-a-service), within an SDK or as source code. Accordingly, sequence diagrams may be transformed into clickable architecture diagrams.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices, which may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Case

The following example use case describes an example of a use of systems and methods of diagram transformation. It is intended solely for explanatory purposes and not in limitation. In one case, a company has a plurality of sequence diagram files, and they would like to view the overall logic-flow of the organization. The organization (e.g., computing device 120) directs a transformer (e.g., transformation server 110) to the plurality of sequence diagram files. The transformer analyzes the sequence diagram files, and converts them into respective architecture diagrams and message lists. The transformer then merges the architecture diagrams by overlaying nodes that exist in more than one architecture diagram, generating a master architecture diagram. The transformer then provides the master architecture to the organization, which may navigate therethrough to visualize an overall logic structure and identify complementary teams and/or resources.

In some circumstances, a master architectural diagram may be useful for network and/or bandwidth planning, network design, and/or network modification. For example, in some cases, message bandwidth may be provided and/or estimated for various messages. With the master architecture diagram, total expected bandwidth requirements between two resources may be determined, for example, based on message sizes and frequencies. Thus, architecture bottlenecks may be identified and accounted-for. In some cases, the master-architecture diagram may provide educational resources for developers and/or architects.

For example, the architecture-viewer may be used for self-guided learning of a master-architecture diagram. As a non-limiting example, text (e.g., in notes), and/or images may be added to the master-architecture diagram, which can act as technical documentation. With a repository full of sequence diagrams (e.g., PlantUML diagrams), an index page may be created showing all available diagrams. In some cases, a simple search function may be provided to more easily find the different flows that a user might be interested in. In some cases, the system architecture-diagram may a) provide links out to instructional materials from within diagram (e.g. using notes), 2) record screencasts using the master-architecture diagram as a visual aid to show message and/or communication flows, and/or 3) provide audio/video feedback (e.g., by embedding a media player within one or more nodes/steps).

What is claimed is:

1. A system comprising:
at least one processor; and
at least one memory having stored thereon computer program code that, when executed by the at least one processor, controls the processor to:
receive data indicative of a plurality of sequence diagrams, the data defining a flow of one or more applications;
for each of the plurality of sequence diagrams, generate a corresponding architecture diagram defining a logic structure of the one or more applications by:
identifying, within the data indicative of the sequence diagram, a plurality of participants within the sequence diagram;
transforming each of the plurality of participants into a respective node, creating a plurality of nodes;
identifying, within the data indicative of the sequence diagram, a plurality of messages; and
transforming the plurality of messages by establishing an edge between respective nodes of the plurality of nodes corresponding to message participants of a message of the plurality of messages;
merge the corresponding architecture diagrams of each of the plurality of sequence diagrams to generate a master architecture diagram;
receive an indication of a selection of a first sequence diagram of the plurality of sequence diagrams, a plurality of nodes and edges of the master architecture diagram having been created based on a plurality of participants and a plurality of messages of the selected first sequence diagram; and
emphasize, within the master architecture diagram and in response to receiving the indication of the selection of the first sequence diagram, the plurality of nodes and edges of the master architecture diagram created based on the plurality of participants and the plurality of messages of the selected first sequence diagram, thereby highlighting a flow of one or more applications within the logic structure of the architecture diagram.

2. The system of claim 1, wherein the computer program code controls the processor to merge the corresponding architecture diagrams by:
identifying one or more co-present nodes within respective architecture diagrams of the corresponding architecture diagrams;
overlaying the respective architecture diagrams; and
removing redundant nodes and edges from the overlaid diagrams.

3. The system of claim 1, wherein the computer program code further controls the processor to, for each of the plurality of sequence diagrams, generate a message listing from the plurality of messages, the message listing comprising a plurality of selectable message items corresponding to respective messages of the plurality of messages, wherein the message listing is separated from the master architecture diagram.

4. The system of claim 3, wherein the computer program code controls the processor to merge the corresponding architecture diagrams by:
identifying one or more shared nodes between respective architecture diagrams of the corresponding architecture diagrams;
overlaying the respective architecture diagrams;
combining the message listings of the respective architecture diagrams; and
removing redundant nodes and edges from the overlaid diagrams.

5. The system of claim 4, wherein the computer program code further controls the processor to:
receive an indication of a selection of a first sequence diagram of the plurality of sequence diagrams;

emphasize, within the master architecture diagram and in response to receiving the indication of the selection, a plurality of nodes and edges of the master architecture diagram corresponding to the selected first sequence diagram; and emphasize, in response to receiving the indication of the selection, message items within the combined message listing corresponding to the selected first sequence diagram.

6. The system of claim 1, wherein the computer program code controls the processor to receive the data indicative of the plurality of sequence diagrams by crawling a repository storing the plurality of sequence diagrams.

7. The system of claim 6, wherein the computer program code further controls the processor to update the master architecture diagram by:

identifying, within the repository, alterations to at least one first participant or first message of the first sequence diagram, the first sequence diagram corresponding to a first architecture diagram of the corresponding architecture diagrams, a first node of the plurality of nodes of the first architecture diagram having been created based on the first participant of the first sequence diagram, and a first edge of the plurality of nodes of the first architecture diagram having been created based on the first message of the first sequence diagram;

modifying at least one of the first node or the first edge of the first architecture diagram based on the identified alterations to the at least one first participant or first message; and merging the modified first architecture diagram with the master architecture diagram.

8. The system of claim 7, wherein the computer program code further controls the processor to present, within the master architecture diagram, a selectable indicator to display either the un-updated master architecture diagram including the unmodified first architecture diagram or the updated master architecture diagram including the modified first architecture diagram.

9. The system of claim 6, wherein the computer program code further controls the processor to update the master architecture diagram by:

identifying, from within the repository, a removal of a first sequence diagram of the plurality of sequence diagrams, a first architecture diagram of the corresponding architecture diagrams having been created based on the first sequence diagram; and extracting, from the master architecture diagram, the first architecture diagram.

10. The system of claim 6, wherein the computer program code further controls the processor to:

identify, within the repository, one or more documents corresponding to a first participant of the plurality of participants, the first participant corresponding to a first node of the plurality of nodes; and link the one or more documents to the first node.

11. The system of claim 10, wherein the computer program code further controls the processor to:

hot-link the one or more documents to the first node; and
in response to the first node being selected, launch the one or more documents.

12. The system of claim 1, wherein the computer program code further controls the processor to:

determine, based on the master architecture diagram, total expected bandwidth requirement between two connected nodes of the master architecture diagram, the two connected being connected by an edge of the master architecture diagram; and increase a bandwidth allocation between the two connected nodes based on the determined total bandwidth requirement.

13. A system comprising:

at least one processor; and at least one memory having stored thereon computer program code that, when executed by the at least one processor, controls the processor to: identify a master architecture diagram corresponding to a plurality of sequence diagrams, each of the plurality of sequence diagrams comprising a plurality of participants and a plurality of messages, the master architecture diagram comprising a plurality of nodes corresponding to respective participants of the plurality of participants and a plurality of edges connecting the plurality of nodes, each of the plurality of edges corresponding to one or more messages of the plurality of messages;

detect, from within the plurality of sequence diagrams, an alteration to a first participant or first message of a first sequence diagram of the plurality of sequence diagrams, a first node of the first architecture diagram corresponding to the first participant of the first sequence diagram, and a first edge of the first architecture diagram corresponding to the first message of the first sequence diagram; and modify the first node or the first edge of the master architecture diagram based on the detected alteration to the first participant or the first message;

receive an indication of a selection of a second sequence diagram of the plurality of sequence diagrams; and emphasize, within the master architecture diagram and in response to receiving the indication of the selection of the second sequence diagram, a plurality of nodes and edges of the master architecture diagram corresponding to the plurality of participants and the plurality of messages of the selected second sequence diagram, thereby highlighting a flow of one or more applications within the architecture diagram.

14. The system of claim 13, wherein the master architecture diagram comprises a representation of a merger of a plurality of individual architecture diagrams, each of the plurality of individual architecture diagrams corresponding to a respective sequence diagram of the plurality of sequence diagrams.

15. The system of claim 14, wherein a first individual architecture diagram of the plurality of individual architecture diagrams corresponds to the first sequence diagram, and the computer program code further controls the processor to modify first node or the first edge of the master architecture diagram by:

extracting the first individual architecture diagram from the master architecture diagram;

modifying a first node or a first edge of the first individual architecture diagram based on the detected alteration; and re-merging the modified first individual architecture diagram with the master architecture diagram.

16. The system of claim 13, wherein the computer program code further controls the processor to detect the alteration to the first sequence diagram by monitoring change logs of the plurality of sequence diagrams.

17. A system comprising:

at least one processor; and at least one memory having stored thereon computer program code that, when executed by the at least one processor, controls the processor to:

identify a master architecture diagram corresponding to a plurality of sequence diagrams, each of the plurality of sequence diagrams comprising a plurality of participants and a plurality of messages, the master architecture diagram comprising a plurality of nodes corresponding to respective participants of the plurality of participants and a plurality of edges connecting the plurality of nodes, each of the plurality of edges corresponding to one or more messages of the plurality of messages;

monitor a repository comprising the plurality of sequence diagrams;

identifying, from within the repository, a removal of a first sequence diagram of the plurality of sequence diagrams, the first sequence diagram corresponding to a first architecture diagram of the corresponding architecture diagrams; and modify the master architecture diagram by removing nodes and edges of the master architecture diagram corresponding to participants and messages of only the first sequence diagram, receive an indication of a selection of a second sequence diagram of the plurality of sequence diagrams; and emphasize, within the master architecture diagram and in response to receiving the indication of the selection of the second sequence diagram, a plurality of nodes and edges of the master architecture diagram corresponding to the plurality of participants and the plurality of messages of the selected second sequence diagram, thereby highlighting a flow of one or more applications within the architecture diagram.

18. The system of claim 17, wherein the master architecture diagram comprises a representation of a merger of a plurality of individual architecture diagrams, each of the plurality of individual architecture diagrams corresponding to a respective sequence diagram of the plurality of sequence diagrams.

19. The system of claim 18, wherein a first individual architecture diagram of the plurality of individual architecture diagrams corresponds to the first sequence diagram, and the computer program code further controls the processor to modify the master architecture diagram by extracting the first individual architecture diagram from the master architecture diagram.

\* \* \* \* \*